360/124

United States Patent [19]
Nölke et al.

[11] Patent Number: 4,984,117
[45] Date of Patent: Jan. 8, 1991

[54] DEVICE WITH READ HEAD FOR MAGNETICALLY RECORDED INFORMATION

[75] Inventors: Günter Nölke, Villingen-Schwenningen; Gunter Ketterer, Unterkirnach; Horst Dyma, VS-Pfaffenweiler, all of Fed. Rep. of Germany

[73] Assignee: Mannesmann Aktiengesellschaft, Düsseldorf, Fed. Rep. of Germany

[21] Appl. No.: 217,844

[22] Filed: Jul. 11, 1988

[30] Foreign Application Priority Data

Dec. 1, 1987 [EP] European Pat. Off. ........ 87730159.8

[51] Int. Cl.$^5$ ................................................. G11B 5/17
[52] U.S. Cl. ........................................................ 360/124
[58] Field of Search ...................... 360/124, 67, 68, 46

[56] References Cited

U.S. PATENT DOCUMENTS 3,165,592 1/1965 Brette .................................. 360/124
4,008,493 2/1977 Pizzuto ............................... 360/124
4,245,268 1/1981 Toshimitsu .......................... 360/124
4,342,059 7/1982 Wray .................................. 360/124

Primary Examiner—Vincent P. Canney
Attorney, Agent, or Firm—Horst M. Kasper

[57] ABSTRACT

A device with a read head (16) for magnetically recorded information in electronic data processing plants, in particular in document processing systems, is subject to disturbances by the document operation systems, where modular device units cause magnetic interference fields in the area of the read head (16). In view of the unavoidability of such magnetic interference fields and in order to dispense substantially with a respective shielding for a magnetic read head and in order to generate nevertheless a sufficiently accurate read signal (20), it is disclosed that a read head (16) and a reference head (17) are combined to a read system (33), where the read head and the reference head are respectively associated with the same mechanical and electrical values. The difference signal of the read head (16) and the reference head (17) is composed of the interference signal (19) and a combination of an interference signal and the read signal (20) at the output (21) of the difference circuit (18) and can be fed to a read electronic (23).

20 Claims, 3 Drawing Sheets

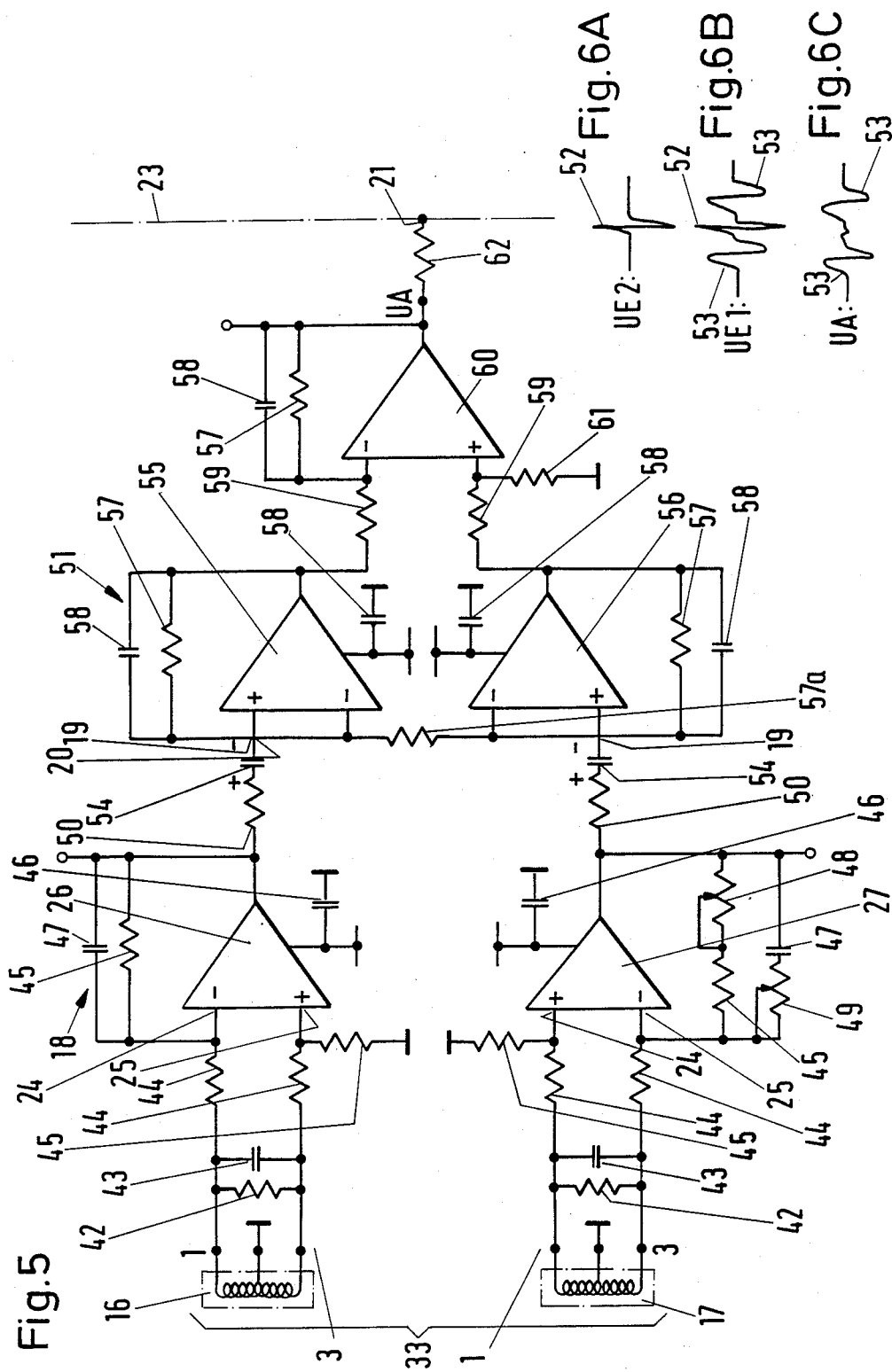

DEVICE WITH READ HEAD FOR MAGNETICALLY RECORDED INFORMATION

BACKGROUND OF THE INVENTION

1. Field of the Invention

The invention relates to a device with a read head for magnetically recorded information in electronic data processing installations, in particular in document processing systems, where certain modular units generate magnetic interference fields in the region of the read head.

2. Brief Description of the Background of the Invention Including Prior Art

Magnetic coils, such as, for example, electromagnetic coils and motor coils, generate magnetic fields resulting in interference fields relative to magnetically recorded information with respect to read heads and influencing substantially the functioning of a magnetic read head. However, if a magnetic read head is to be employed instead of an optical read head, it is not possible to eliminate these interference fields in electronic data processing equipment such as, for example, in document processing systems, sorting systems, printers with readers and the like.

In so-called document processing systems, the so-called Magnetic Ink Character Recognition, MICR characters, are read at a reading speed of about 45 cm/sec, where magnetic interferences are noted in a particularly disadvantageous way. The step of shielding the device groups generating the interference fields does not result in a desired success because, on the one hand, a complete shielding is not possible and, on the other hand, the shielding measures themselves result in side effects of a larger equipment expenditure and of an undesirable thermal insulation of the modular units of the document processing system. A heating up of such equipment, however, is permissible only within certain limits. Therefore, a shielding of the modular units generating the magnetic interference fields is not a sufficient means to resolve the problem of magnetic interference fields.

SUMMARY OF THE INVENTION

1. Purposes of the Invention

It is an object of the present invention to provide a magnetic read head system which can operate precisely and accurately even in the presence of magnetic interference fields and without the presence of shielding.

It is another object of the present invention to provide a system for magnetic reading which provides an accurate signal and eliminates substantially side effects based on interference fields.

It is yet another object of the invention to provide a method which allows an accurate determination of magnetically recorded information with a magnetic read head and which is not susceptible to interference by spurious interference fields.

These and other objects and advantages of the present invention will become evident from the description which follows.

2. Brief Description of the Invention

The present invention provides for a device with a read head for reading magnetically recorded information in connection with electronic data processing equipment. A read head is supported at a frame. The read head and a reference head are combined to a reading system such that the read head and the reference head are associated in each case with equal mechanical and electrical values. A difference circuit has an output where the read head and the reference head are switched together to the difference circuit. The difference signal of the read head and of the reference head is formed from a two-fold interference signal. A read signal is furnished at the output of the difference circuit of a read electronic.

Parallel connected amplifiers, which can be connected as difference amplifiers, can have an input for an interference voltage from the reference head, an input for a mixing voltage from the read head, and an output where the interference voltage UE2 at the reference head and the mixing voltage UE1 at the read head can be respectively applied at inputs of said parallel-connected amplifiers. A read electronic can be connected to the output of the parallel connected amplifiers where an output signal UA from the output can be applied at the read electronic.

Adjustment means can be disposed on the parallel-connected amplifiers and coordinated to the input associated with the reference head for adjusting the adjustment means such that a balancing of the received interference voltage UE2 can be performed according to amplitude and phase.

A substantially closed metal casing can be disposed at the frame. Only an opening can be provided at the substantially closed metal casing for the read head at the head mirror side. The read head and the reference head can be disposed together in the substantially closed metal casing.

A metal casing can have an opening. This opening can be provided at a head mirror side of the reference head. A cover can close the opening. The cover can be made of a non-magnetically conducting material.

The electronic processing equipment can be a document processing systems.

Device groups can generate magnetic interference fields in the region of the read head.

The difference circuit can further comprise an input for the reference head and for the read head, as well as an impedance matching resistor and an impedance matching capacitor for the input of the reference head and an impedance matching resistor and an impedance matching capacitor for the input of the read head. Furthermore, an input resistor can be connected respectively to the input of the reference head and to the input of the read head. An amplifier can be connected respectively to the input of the reference head and to the input of the read head.

A blocking capacitor can be connected respectively to the amplifier associated with the reference head and to the amplifier associated with the read head. A load resistor can be connected between an input of the amplifier associated with the read head and an output of the amplifier associated with the read head. A phase capacitor can be connected between an input of the amplifier associated with the read head and an output of the amplifier associated with the read head. A load resistor, connected in series with a potentiometer, can be connected between an input of the amplifier associated with the reference head and an output of the amplifier associated with the reference head. A phase capacitor, connected in series with a potentiometer phase capacitor, can be connected between an input of the amplifier associated with the reference head and an output of the amplifier associated with the reference head.

Preferably, the difference circuit further comprises a further amplifier associated with the read head having a first and a second input and a further amplifier associated with the reference head having a first and a second input. An input resistor, connected in series with a coupling capacitor, can be connected to the output of the amplifier accociated with the read head and connected to the first input of the further amplifier associated with the read head. An input resistor, connected in series with a coupling capacitor, can be connected to the output of the amplifier associated with the reference head and connected to the first input of the further amplifier associated with the reference head. A difference resistor, having a first and a second end, can e connected with the first end to the second input of the further amplifier associated with the read head and connected with the second end to the second input of the further amplifier associated with the reference head.

The further amplifier associated with the read head and thhe further amplifier associated with the reference head can have an output. Preferably, the difference circuit further comprises a further read load resistor connected to the second input and the output of the further amplifier associated with the read head. A further read blocking capacitor can be connected to the second input and the output of the further amplifier associated with the read head. A further reference load resistor can be connected to the second input and the output of the further amplifier associated with the reference head. A further reference blocking capacitor can be connected to the second input and the output of the further amplifier associated with the reference head. A signal amplifier can have a first input, a second input and an output. A further read input resistor can have a first and a second end and can be connected with the first end to the output of the further read amplifier and with the second end to the first input of the signal amplifier. A further reference input resistor can have a first and a second end and can be connected with the first end to the output of the further reference amplifier and with the second end to the second input of the signal amplifier. An output resistance can be connected to the output of the signal amplifier.

The invention also relates to a method for eliminating signals originating with magnetic interference fields in the reading devices with magnetic read heads. A read head is supported at a frame for reading magnetically recorded information in connection with electronic data processing equipment. A reference head and the read head are combined at the frame to a read system such that the read head and the reference head are associated in each case with equal mechanical and electrical values. Electrical read signals are derived from the read head and electrical reference signals are derived from the reference head. The electrical read signals are fed to a read amplifier and the electrical reference signals are fed to a reference amplifier. The output from the read amplifier is compared with the output from the reference amplifier. The interference signals are eliminated from the read signal in an output of the signal amplifier.

According to the invention, a read head and a reference head are combined to a read system, where the read head and the reference head, respectively, have the same mechanical and electrical values, and where the read head and the reference head are switched together in a difference circuit, and where the resulting difference connection or difference circuit of the two-fold interference signal and of the read signal can be fed from the output of the difference circuit to a read electronic. Based on this system, it has been found that even very strong interference fields do no longer substantially influence the digitalization of the read signal. For example, the recited construction allowed to achieve a clear and problem-free read signal. This effect was successfully tested both in the reading of characters according to the system CMC 7 and the system E-13B. Laboratory measurements have illustrated that, depending on the quality of the sequentially-connected difference circuit, the interference signal can be substantially reduced.

A preferred embodiment of the invention comprises that the interference voltage at the reference head and the mixing voltage at the read head are respectively applied at inputs parallel connected amplifiers, which are switched as difference amplifiers, and where the output signal of the difference amplifiers is employed by the read electronic.

According to a further feature of the invention, a part of the amplifier coordinate to the reference head can be balanced and adjusted such that a balancing of the received interference voltage can be performed according to amplitude and phase.

A further advantageous aspect of the invention, in particular in practical applications, provides that the read head and the reference head are disposed together in a substantially closed metal casing, where an opening is provided only at the head mirror side for the read head.

The invention provides the further improvement that an opening provided at the head mirror side of the reference head is closed in the metal casing by a cover of a non-magnetically conducting material.

The novel features which are considered characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 5 is a difference circuit for the read system with symmetrical signal inputs, FIG. 6A shows a pulse diagram for an interference signal, FIG. 6B illustrates a useful signal with superimposed interference signal, and FIG. 6C shows the useful signal cleaned and freed from the interference signal.

DESCRIPTION OF INVENTION AND PREFERRED EMBODIMENT

Figure 1:
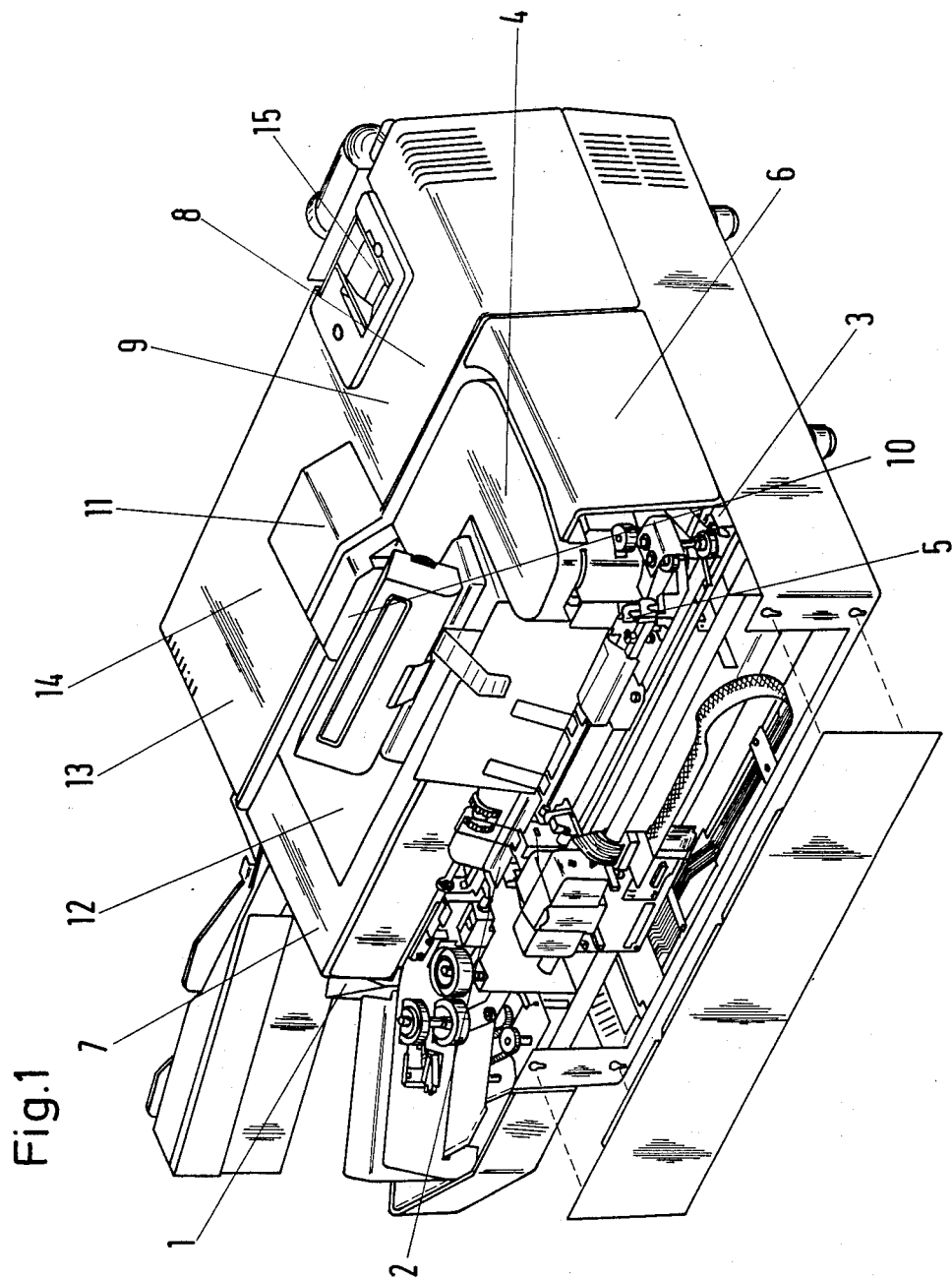
FIG. 1 illustrates a perspective schematic view of a data processing apparatus, which is a document processing apparatus in this example, with an indication of the device groups, which generate magnetic interference fields in the region of the read head.

In accordance with the present invention, there is provided a device with a read head 16 for magnetically recorded information in electronic data processing equipment, in particular in document processing systems. The modular units generate magnetic interference field in the region of the read head 16. The read head 16 and a reference head 17 are combined to a read system 33 with, in each case, equal mechanical and electrical values and which are switched together in a difference circuit 18. A difference signal of the read head and of the reference head is formed from a two-fold interference signal 19 and a read signal 20 at the output 21 of the difference circuit 18 of a read electronic 23.

The interference voltage UE2 at the reference head 17 and the mixing voltage UE1 at the read head 16 can be respectively applied at inputs 24, 25 of parallel-connected amplifiers 26, 27, which are connected as difference amplifiers, and where the output signal UA can be applied at the read electronic 23.

A part of the amplifier 27, coordinated to the reference head 17, can be adjusted such that a balancing of the received interference voltage UE2 can be performed according to amplitude and phase.

The read head 16 and the reference head 17 can be disposed together in a substantially closed metal casing 28, where an opening 30 for the read head 16 is preferably provided only at the head mirror side 29.

An opening 31, provided in the metal casing 28, provided at the head mirror side 29 of the reference head 17, can be closed by a cover 32 made of a non-magnetically conducting material.

Interference field generators are designated with their own symbols according to FIG. 1 in case of a document processing apparatus. These interference field generators cause undesired magnetic fields for the reading of magnetically recorded information. In this context, components occur as disturbance generators for the useful read information signal, which components operate synchronously and simultaneously with the read head. Such interference fields are caused by a DC motor 1 for the stack feed, by a DC motor 2 for the document transport, by a step motor 3 for a read slider, a DC motor 4 for the lifting of a document, a pull-off roller 5 which can be actuated by a magnet for the lifting of a document, a DC motor 6 for the document transport, a step motor 7 for the transport belt, a step motor 8 for a daisy wheel or a type wheel, a hammer magnet 9 for the type wheel, an endorsing stamp 10 driven by an electromagnet, a stamp 11 which can also be actuated by an electromagnet, a pin print head 12 for an endorsing printer, a pin print head 13 for a personalized document printer, a DC motor 14 for a line switching and a journal printer 15.

Figure 2:
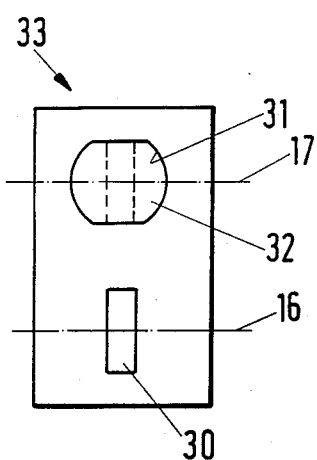
FIG. 2 is a front view of the read system.
Figure 3:
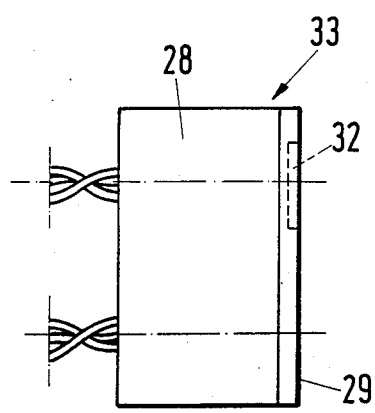
FIG. 3 is a side view of the read system.

A read head 16 (FIG. 2), depending on its particular construction, can in principle comprise a magnet system with windings, a magnetoresistive sensor or, for example, a Hall sensor. Such a read head 16 and a reference head 17 are illustrated in FIGS. 2 and 3, where the read head 16 and the reference head 17 are disposed together in a substantially closed metal casing 28 and where an opening 30 is only provided at the head mirror side 29 for the read head 16. An opening 31, provided at the head mirror side 29 of the reference head 17 in the metal casing 28, is closed by a cover 32 made of a non-magnetically conductive material. The modular unit illustrated in FIGS. 2 and 3 forms a read system 33.

Figure 4:
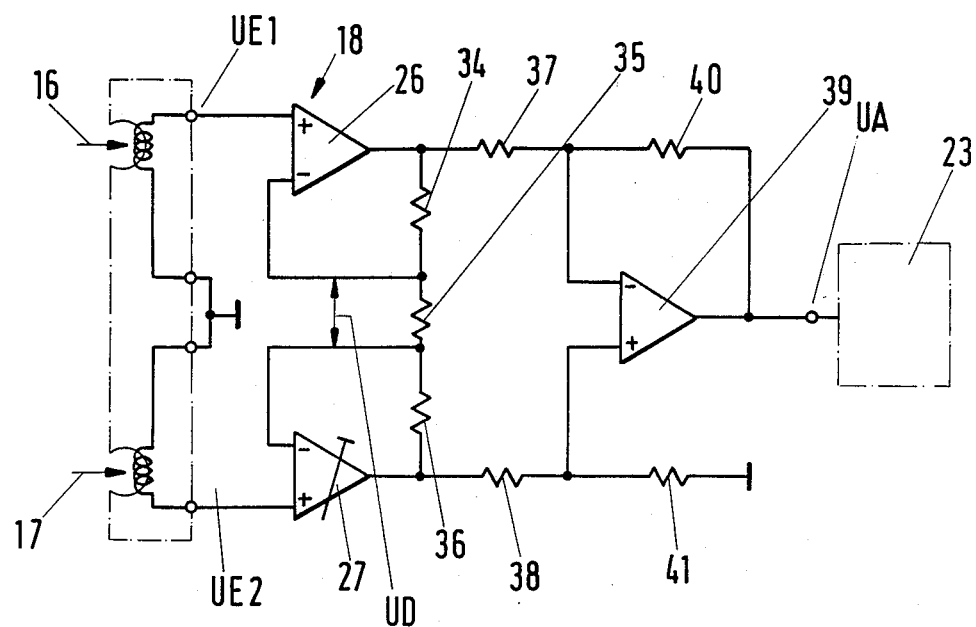
FIG. 4 is a block circuit diagram of the read system with asymmetrical signal input.

An asymmetric signal input is to be employed in the block circuit diagram according to FIG. 4, where the signal input includes the read head 16 and the reference head 17. Correspondingly, the interference voltage UE2 and the mixing voltage UE1 at the read head 16, respectively, are switched onto the positive inputs of the amplifiers 26 and 27, which form the difference circuit 18. The difference voltage UD can be picked up between the load resistors 34 and 35 or, respectively, between 35 and 36. The adapter resistors 37 and 38 are switched following these amplifiers 26 and 27. A signal amplifier 39 amplifies the received difference signal and the amplifier 39 is switched with load resistors 40, 41 at the read electronic 23 or, respectively, against a ground. Therefore, the output signal UA of the amplifier 39 is present at the input of the read electronic 23.

According to the disclosure of the invention, the amplifier 27 is provided with elements for balancing of the received interference voltage UE2 relative to amplitude and phase. The amplifier 27 is therefore an adjustable amplifier.

The difference circuit 18 with symmetrical signal inputs is illustrated in FIG. 5, where the read head 16 and the reference head 17 form the read system 33. In each case, impedance-matching resistors 42 including an impedance-matching capacitor 43 are switched and connected to the inputs 1 and 3. The input resistors 44 are connected at the specific inputs 24 and 25 and are placed ahead of the parallel connected amplifiers 26 and 27. In addition, a load resistor 45 is connected in each case to the positive input. The amplifiers 26, 27 are further protected by blocking capacitors 46 against interfering influences. In each case, a phase capacitor 47 is connected in parallel in addition to the load resistor 45 at the negative inputs of the amplifiers 26 and 27. A potentiometer 48 for the amplitude and an adjustable balancing resistor 49 for the phase are part of the load resistor 45 at the reference head 17. In each case, an input resistor 50 is connected ahead of the difference forming circuit 51 as illustrated in the center part of the circuit diagram according to FIG. 5. The interference signal 19 and the read signal 20 are applied at the positive input of the difference forming circuit 51 in the area of the amplifier 55 and the interference signal 19 is applied at the positive input of the amplifier 56. In each case, a coupling capacitor 54 is connected between these inputs for a difference forming circuit 51 and the input resistors 50. The difference forming circuit 51 substantially comprises the amplifiers 55 and 56. The amplifiers 55 and 56 connected in parallel are combined together by way of load resistors 57 and the blocking capacitors 58. A difference resistor 57a generates the signal difference proper. The outputs of the amplifiers 55 and 56 connected in parallel are connected via an input resistor 59 ahead of a signal amplifier 60 which, in addition, exhibits a load resistor 57 and a phase capacitor 58. In addition, a load resistor 61 is connected to the positive input of the signal amplifier 60. The desired voltage UA is applied at the outputs 21 at an output resistor 62. This difference signal is fed to the read electronic 23.

The interference signal 52 is applied at the read head 16 (footnote 1, UE1, FIG. 6B) and at the reference head 17 (footnote 2, UE2, FIG. 6A) according to FIGS. 6A to 6C. The interference voltage UE2 (FIG. 6A) forms the recorded pulse which, according to FIG. 6B, is appearing interferingly between the respective useful signals 53. The circuits provided by way of FIGS. 4 and 5 allow it now to decrease the interference signal 52 to such a negligible small value that the output signal UA in FIG. 6C comprises, for all practical purposes, only the useful signals 53.

The distance between the read head and the reference head can be less than 5 times the diameter of the read head and is preferably less than 1 times the diameter of the read head.

It will be understood that each of the elements described above, or two or more together, may also find a useful application in other types of devices with a read head differing from the types described above.

While the invention has been illustrated and described as embodied in a device with read head for magnetically recorded information, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device with a read head for reading magnetically recorded information in connection with electronic data processing equipment, comprising
   a frame;
   a read head;
   a reference head, where the read head and the reference head are combined to a reading system such that the read head and the reference head are associated in each case with equal mechanical and electrical values;
   a difference circuit having an output where the read head and the reference head are each connected to the difference circuit and where the difference signal of the read head and of the reference head is formed from a combination signal derived of an electromagnetic interference field and an electromagnetic read field and, respectively, of an electromagnetic interference field and where the difference signal is furnished at the output of the difference circuit of a read electronic;
   parallel connected amplifiers, which are connected as differential amplifiers, having an input for a interference voltage from the reference head, having an input for a mixing voltage from the read head, and having an output, where the interference voltage (UE2) at the reference head and the mixing voltage (UE1) at the read head are respectively applied at inputs of said parallel-connected amplifiers;
   a read electronic connected to the output of the parallel connected amplifiers where an output signal (UA) from the output is applied at the read electronic.

2. The device with a read head for reading magnetically recorded information according to claim 1, further comprising
   a substantially closed metal casing disposed at the frame where only an opening is provided at the substantially closed metal casing for the read head at the side of the casing having a head mirror and where the read head and the reference head are disposed together in the substantially closed metal casing.

3. The device with a read head for reading magnetically recorded information according to claim 1, further comprising
   a metal casing having an opening, which opening is provided at a head mirror side of the reference head;
   a cover closing the opening where the cover is made of a non-magnetically conducting material.

4. The device with a read head for reading magnetically recorded information according to claim 1, wherein the electronic processing equipment is a document processing systems.

5. The device with a read head for reading magnetically recorded information according to claim 1, further comprising
   device groups generating magnetic interference fields in the region of the read head.

6. The device with a read head for reading magnetically recorded information according to claim 1, wherein the difference circuit further comprises
   an input for the reference head;
   an input for the read head;
   an input resistor connected to the input of the reference head;
   an input resistor connected to the input of the read head.

7. The defice with a read head for reading magnetically recorded information according to claim 1, wherein the difference circuit further comprises
   an input for the reference head;
   an input for the read head;
   an amplifier connected to the input for the reference head;
   an amplifier connected to the input for the read head.

8. A dlefice with a read head for reading magnetically recorded information in connection with electronic data processing equipment, comprising
   a frame;
   a read head;
   a reference head, where the read head and the reference head are combined to a reading system such that the read head and the reference head are associated in each case with equal mechanical and electrical values;
   a difference circuit having an output where the read head and the reference head are switched together to the difference circuit and where the difference signal of the read head and of the reference head is formed from an interference signal and a combination signal of interference signal and read signal and where the difference signal is furnished at the output of the difference circuit of a read electronic;
   adjustment means disposed on the parallel-connected amplifiers and coordinated to the input associated with the reference head for adjusting the adjustment means such that a balancing of the received interference voltage (UE2) can be performed according to amplitude and phase.

9. A device with a read head for reading magnetically recorded information inconnection with electronic data processing equipment, comprising
   a frame;
   a read head;

a reference head, where the read head and the reference head are combined to a reading system such that the read head and the reference head are associated in each case with equal mechanical and electrical values;

a difference circuit having an output where the read head and the reference head are switched together to the difference circuit and where the difference signal of the read head and of the reference head is formed from an interference signal and a combination signal of interference signal and read signal and where the difference signal is furnished at the output of the difference circuit of a read electronic;

wherein the difference circuit comprises an input for the reference head;

an input for the read head;

an impedance matching resistor for the input of the reference head;

an impedance matching resistor for the input of the read head;

an inpedance matching capacitor for the input of the reference head;

an impedance matching capacitor for the input of the read head.

10. The device with a read head for reading magnetically recorded information according to claim 9, further comprising a substantially closed metal casing disposed at the frame where only an opening is provided at the substantially closed metal casing for the read head at the side of the casing having a head mirror and where the read head and the reference head are disposed together in the substantially closed metal casing.

11. The device with a read head for reading magnetically recorded information according to claim 9, further comprising a metal casing having an opening, which opening is provided at a head mirror side of the reference head;

a cover closing the opening where the cover is made of a non-magnetically conducting material.

12. A device with a read head for reading magnetically recorded information in connection with electronic data processing equipment, comprising a frame;

a read head;

a reference head, where the read head and the reference head are combined to a reading system suvch that the read head and the reference head are associated in each case with equal mechanical and electrical values;

a difference circuit having an output where the read head and the reference head are switched together to the difference circuit and where the difference signal of the read head and of the reference head is formed from an interference signal and a combination signal of interference signal and read signal and where the difference signal is furnished at the output of the difference circuit of a read electronic;

wherein the difference circuit further comprises an input for the reference head;

an input for the read head;

an amplifier connected to the input for the reference head;

an amplifier connected to the input for the read head;

wherein the difference circuit comprises a blocking capacitor connected to the amplifier associated with the reference head;

a blocking capacitor connected to the amplifier associated with the read head;

a load resistor connected between an input of the amplifier associated with the read head and an output of the amplifier associated with the read head;

a phase capacitor connected between an input of the amplifier associated with the read head and an output of the amplifier associated with the read head;

a load resistor connected in series with a potentiometer connected between an input of the amplifier associated with the reference head and an output of the amplifier associated with the reference head;

a phase capacitor connected in series with a potentiometer phase capacitor connected between an input of the amplifier associated with the reference head and an output of the amplifier associated with the reference head.

13. A device with a read head for reading magnetically recorded information in connection with electronic data processing equipment, comprising a frame;

a read head;

a reference head, where the read head and the reference head are combined to a reading system such that the read head and the reference head are associated in each case with equal mechanical and electrical values;

a difference circuit having an output where the read head and the reference head are switched together to the difference circuit and where the difference signal of the read head and of the reference head is formed from an interference signal and a combination signal of interference signal and read signal and where the difference signal is furnished at the output of the difference circuit of a read electronic;

wherein the difference circuit comprises an input for the reference head;

an input for the read head;

an amplifier connected to the input for the reference head;

an amplifier connected to the input for the read head;

wherein the difference circuit further comprises a further amplifier associated with the read head having a first and a second input;

a further amplifier associated with the reference head having a first and a second input;

an input resistor connected in series with a coupling capacitor connected to the output of the amplifier associated with the read head and connected to the first input of the further amplifier associated with the read head;

an input resistor connected in series with a coupling capacitor connected to the output of the amplifier associated with the reference head and connected to the first input of the further amplifier associated with the reference head;

a difference resistor having a first and a second end connected with the first end to the second input of the further amplifier associated with the read head and connected with the second end to the second input of the further amplifier associated with the reference head.

14. The device with a read head for reading magnetically recorded information according to claim 13, wherein the further amplifier associated with the read head has an output;

wherein the further amplifier associated with the reference head has an output;

wherein the difference circuit further comprises a further read load resistor connected to the second input and the output of the further amplifier associated with the read head;

a further read blocking capacitor connected to the second input and the output of the further amplifier associated with the read head;

a further reference load resistor connected to the second input and the output of the further amplifier associated with the reference head;

a further reference blockiing capacitor connected to the second input and the output of the further amplifier associated with the reference head.

15. The device with a read head for reading magnetically recorded information according to claim 13, wherein the further amplifier associated with the read head has an output;

wherein the further amplifier associated with the reference head has an output;

wherein the difference circuit further comprises a signal amplifier having a first input, a second input and an output;

a further read input resistor having a first and a second end and connected with the first end to the output of the further read amplifier and with the second end of the first input of the signal amplifier;

a further reference input resistor having a first and a second end and connected with the first end to the output of the further reference amplifier and with the second end to the second input of the signal amplifier;

an output resistance connected to the output of the signal amplifier.

16. Device with a red head (16) for magnetically recorded information in electronic data processing equipment, in particular in document processing systems, where the device groups generate magnetic interference fields in the region of the read head (16), wherein the read head (16) and a reference head (17) are combined to a read system (33) with, in each case, equal mechanical and electrical values and which are switched together in a difference circuit (18) and where the difference signal of the read head and of the reference head is formed from the interference signal (19) and a combination of an interference signal (19) and the read signal (20) at the output (21) of the difference circuit (18) of a read electronic (23); wherein the interference voltage (UE2) at the reference head (17) and the mixing voltage (UE1) at the read head (16) are respectively applied at inputs (24, 25) of parallel-connected amplifiers (26, 27), which are connected as differential amplifiers, and where the output signal (UA) is applied at the read electronic (23).

17. Device according to claim 16, wherein the read head (16) and the reference head (17) are disposed together in a substantially closed metal casing (28), where an opening (30) for the read head (16) is provided only at the head mirror side (29).

18. Device according to claim 16, wherein an opening (31), provided in the metal casing (28), provided at the head mirror side (29) of the reference head (17), is closed by a cover (32) made of a non-magnetically conducting material.

19. Device with a read head (16) for magnetically recorded information in electronic data processing equipment, in particular in document processing systems, where the device groups generate magnetic interference fields in the region of the read head (16), wherein a read head (16) and a reference head (17) are combined to a read system (33) with, in each case, equal mechanical and electrical values and which are switched together in a difference circuit (18) and where the difference signal of the read head and of the reference head is formed from the interference signal (19) and a combination of an interference signal (19) and the read signal (20) at the output (21) of the difference circuit (18) of a read electronic (23); wherein a part of the amplifier (27), coordinated to the reference head (17), is adjusted such that a balancing of the received interference voltage (UE2) can be performed according to amplitude and phase.

20. Device according to claim 19, wherein the read head (16) and the reference head (17) are disposed together in a substantially closed metal casing (28), where an opening (30) for the read head (16), is provided only at the head mirror side (29).

* * * * *